United States Patent Office 2,948,147
Patented Aug. 9, 1960

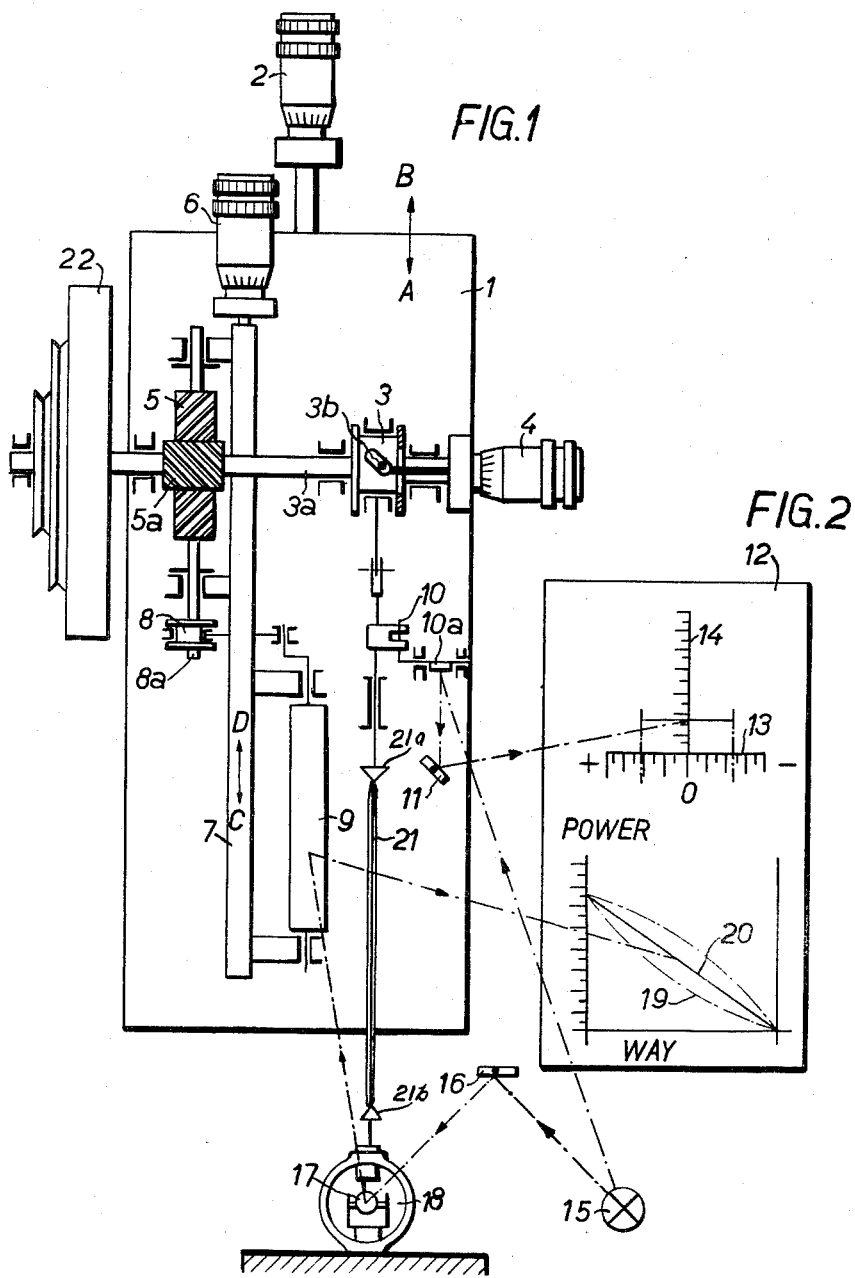

2,948,147

APPARATUS FOR MEASURING AND RECORDING THE DYNAMIC MODULUS OF ELASTICITY

Hermann Roelig and Josef Schmahl, Leverkusen, Germany, assignors to Farbenfabriken Bayer Aktiengesellschaft, Leverkusen, Germany, a corporation of Germany Filed Aug. 23, 1955, Ser. No. 530,150

Claims priority, application Germany Sept. 2, 1954

10 Claims. (Cl. 73—89)

The invention relates to an apparatus for measuring and recording the dynamic modulus of elasticity, and the mechanical damping and the flow of elastic substances, for example plastics, textiles or the like, in which the test specimen clamped between a dynamometer and a pulsating device is subjected to a dynamic stress and the relation between the path of deformation and the force of reaction is continuously recorded on a ground glass screen as a damping loop by means of an oscillating force mirror and an oscillating travel (i.e. deformation path) mirror, the phase angles of which differ from one another owing to the damping.

For investigating chemical structure of materials with resilient properties, it is important to know the way in which the damping path depends on temperature or excitation frequency.

Hitherto this has necessitated a time-wasting determination of the area of the damping loops, this determination consisting in the copying of the image recorded by the light point and in the planimetric measurement of the damping area. Moreover, it is impossible accurately to evaluate the damping loop with substances having a low damping value (smaller than 10%).

In accordance with the invention it has now been found that these disadvantages are overcome if the difference in phase angle of the two mirrors is balanced at zero by a relative rotation of the travel mirror carried out during the testing operation, the degree of rotation of the travel mirror being a measure of the damping of the test specimen.

As a result of the phase position of the travel mirror being matched in this way to that of the force mirror during the testing operation, the original damping loop of the test specimen on the ground glass becomes a line, the position and slope of which indicate the value of the alternating load imposed on the test specimen by means of the pulsating device.

In an apparatus in accordance with the invention the travel mirror is fitted with an eccentric drive which has a common drive with the eccentric drive of the pulsating device, the two shafts of the eccentrics being at right-angles to one another and being in mesh by means of helical gears which are displaceable axially in relation to one another during the rotation of the two shafts.

The travel mirror is secured on a carriage with its eccentric drive and the helical gear which is arranged on the eccentric shaft, the carriage being displaceable at right angles to the shaft of the eccentric of the pulsating device. If the carriage is displaced a certain distance, the helical gear which is arranged on the eccentric shaft of the travel mirror and is in mesh, for example with a transmission ratio of 1:1, with the helical gear of the eccentric of the pulsating device, is rotated by a supplementary angular amount in relation to the rotation of the common drive means. The travel mirror is also rotated by this angular distance by means of the eccentric simultaneously with the helical gear. In this manner, the damping loop on the ground glass screen is modified, and it becomes a line when the value of the angle corresponds to the value of the phase displacement angle between the oscillating travel mirror and the oscillating force mirror.

In order to be able to vary the path of deformation of the test specimen during the testing process within wide limits, the eccentric of the pulsating device is fitted with a stroke-adjustment device which varies the eccentricity. By varying the eccentricity, the amplitudes of the changing stresses on the test specimen can be varied. The phase position of the force mirror, however, is not altered by the adjustment of the stroke in relation to that of the travel mirror. Furthermore, despite the fact that the path of deformation is variable within wide limits by means of the stroke-adjusting device, the deflection in movement of the travel mirror as indicated on the ground glass screen remains constant, since the mirror is driven by the driving shaft of the pulsating device by way of the helical gears in the transmission ratio of 1:1.

The length of stroke of the pulsating device, i.e. the length of the path of deformation of the test specimen, can be separately indicated on the ground glass screen by means of an oscillating mirror coupled to the pulsating device by way of a deflecting mirror. The static bias of the test specimen can be separately read off by means of a micrometer screen, which serves for the displacement of a support on which are jointly arranged the driving parts of the testing apparatus, that is, the pulsating device, and also the travel mirror with eccentrics and helical gear drive. The flow of the material during the measuring operation can be recognised as a parallel displacement of the damping line in the direction of the force on the force-travel diagram.

One embodiment of the invention is shown by way of example in the accompanying diagrammatic drawing in which Fig. 1 is a top view of an apparatus for measuring and recording the dynamic modulus of elasticity, while Fig. 2 shows a ground glass screen which is disposed at right-angles to the base plate of the apparatus shown in Fig. 1 and which, for explaining the measuring operation, is tilted into the plane of the drawing.

All the driving parts of the test machine are located on a common base plate 1, which can be adjusted in the direction A—B by means of a micrometer spindle 2. The test specimen 21, which is held by holders 21a and 21b so that it is fixed at one end to a force responsive means in the form of the force-measurement device (dynamometer) 18 and at the other end to an eccentric 3 of the pulsating device, which is driven by means of the stepped pulley 22, can be given a preliminary static load by means of the micrometer spindle 2 and can also be subjected to a dynamic stress by means of the eccentric 3. The force-travel diagram is transmitted optically on to a ground glass screen 12 which is disposed at right-angles to the base plate and which, for explaining the measuring operation, is tilted into the plane of the drawing (Figure 2), the said transmission being such that the indication of the force by a light beam of the light source 15, which beam travels by way of a deflecting mirror 16 to the mirror (concave mirror) 17 of the dynamometer and from thence by way of the oscillating mirror 9 which indicates the travel axis of the force-travel diagram, is deflected towards the ground glass screen 12. The deformation path is indicated with constant deflection through the travel mirror 9 at right-angles to the force axis. The stroke of the eccentric 3, which is driven by way of the shaft 3a can be adjusted continuously and during operation from zero to a maximum by means of the graduated setting screw 4. The adjustment is effected by means of a helically toothed shaft which is concurrently moved and in which is mounted the pin 3b guided in a slot of the eccentric 3. The exact value of the stroke is greatly magnified optically by a second path of light through measurement mirror 10a which is arranged to be turnable by means of a lever 10 and tilts in phase with the reciprocating drive. The said light beam is deflected by the deflecting mirror 11 on to the scale 13 of the ground glass screen 12 and can be accurately read off thereon. The deflecting mirror 11, which is fixed to the base plate 1, also enables the position of the base plate 1 and the length and elongation of the test specimen 21 to be read off on the scale 14 of the ground glass screen 12. The travel mirror 9 is driven by the driving shaft 3a through helical gearing 5 and 5a, the shaft 8a and the eccentric 8. A carriage or slide system 7, which carries the bearings of the mirror 9 and also the bearings of the shaft 8a of the helical gear 5, can be adjusted backwards and forwards parallel to the plate 1 by means of a micrometer screw 6, this adjustment being in a direction C—D relatively to the movement A—B. By displacing the helical gear 5, which is operatively mounted on shaft 8a, relatively to the gear 5a, which is operatively mounted on shaft 3a, the phase position of the two driving shafts 3a and 8a is varied. The damping of a material is measured by compensating the damping loop 19, caused by phase displacement between travel and force and shown in chain-dotted lines on the ground glass screen 12, to give a line 20 by means of the micrometer screw 6. The micrometer screw 6 permits varying the phase angle of synchronization and also provides an indicator for indication of the phase angle.

We claim:

1. Testing apparatus for evaluating the damping loop of elastic materials comprising reciprocating drive means, force responsive means, means for holding a test specimen of elastic material between said reciprocating drive means and force responsive means, a force indicator mirror mounted for tilting actuation by said force responsive means, a travel mirror, means for partially rotating said travel mirror back and forth in synchronization with said reciprocating drive, a screen, means for projecting a beam of light from said force indicating mirror to said travel mirror onto said screen, and means including indicator means cooperating with said drive means for varying the phase angle of synchronization between said reciprocating drive and partial rotation of said travel mirror.

2. Testing apparatus according to claim 1 in which said travel mirror is mounted with its axis of rotation substantially parallel to the drive direction of said reciprocating drive means.

3. Testing apparatus according to claim 2 in which said reciprocating drive means includes a first rotatable drive shaft and a first eccentric drive which is mounted on said drive shaft, said means for partially rotating said travel mirror comprising a second rotatable drive shaft extending at right angles with respect to said first mentioned drive shaft and a second eccentric drive which is mounted on said second drive shaft, said second drive shaft being connected for rotation with said first drive shaft by a pair of meshing helical gears one of which is operatively mounted on said first drive shaft and the other of which is operatively mounted on said second drive shaft, and in which said means for varying the phase angle includes means for axially varying the position of engagement of said helical gears.

4. Testing apparatus according to claim 3 in which said means for varying the phase angle comprises a calibrated micrometer screw for axially adjusting the position of the helical gear mounted on said second rotatable drive shaft with respect to the other helical gear, said second rotatable drive shaft being disposed with its axis of rotation parallel to the drive direction of the reciprocating drive means.

5. Testing apparatus according to claim 4 including means for varying the amplitude of drive of said reciprocating drive means.

6. Testing apparatus according to claim 5 including a tiltable mirror, means connected to said reciprocating drive means for tilting actuation of said tiltable mirror in phase with the reciprocating drive means, and means for projecting a beam of light from said tiltable mirror onto said screen.

7. Testing apparatus according to claim 6 in which said reciprocating drive means and travel mirror are mounted on a common support and including means for varying the distance of said common support from said force responsive means in a direction substantially parallel to the drive direction of said reciprocating drive means.

8. Testing apparatus according to claim 1 including means for varying the amplitude of drive of said reciprocating drive means.

9. Testing apparatus according to claim 1 including a tiltable mirror, means connected to said reciprocating drive means for tilting actuation of said tiltable mirror, and means for projecting a beam of light from said tiltable mirror onto said screen.

10. Testing apparatus according to claim 1 in which said reciprocating drive means and travel mirror are mounted on a common support and including means for varying the distance of said common support from said force responsive means in a direction substantially parallel to the drive direction of said reciprocating drive means.

References Cited in the file of this patent
UNITED STATES PATENTS

| | | |
|---|---|---|
| 1,558,594 | Coffin | Oct. 27, 1925 |
| 1,939,161 | Bestelmeyer | Dec. 12, 1933 |
| 2,066,311 | Appel | Jan. 5, 1937 |
| 2,724,310 | Paine | Nov. 22, 1955 |